US008670960B2

(12) United States Patent
Couet et al.

(10) Patent No.: US 8,670,960 B2
(45) Date of Patent: Mar. 11, 2014

(54) PROXY METHODS FOR EXPENSIVE FUNCTION OPTIMIZATION WITH EXPENSIVE NONLINEAR CONSTRAINTS

(75) Inventors: Benoit Couet, Belmont, MA (US); Kashif Rashid, Middlesex (GB); David Wilkinson, Ridgefield, CT (US); Saumil Ambani, Ann Arbor, MI (US); Eren Cetinkaya, Ann Arbor, MI (US); Hugues Djikpesse, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 286 days.

(21) Appl. No.: 12/914,270

(22) Filed: Oct. 28, 2010

(65) Prior Publication Data
US 2011/0270591 A1 Nov. 3, 2011

Related U.S. Application Data

(60) Provisional application No. 61/314,342, filed on Mar. 16, 2010.

(51) Int. Cl.
*G06F 17/10* (2006.01)
*G06F 17/17* (2006.01)

(52) U.S. Cl.
USPC .................................. 703/2; 703/10; 706/19

(58) Field of Classification Search
None
See application file for complete search history.

(56) References Cited

U.S. PATENT DOCUMENTS

| 2005/0143962 A1* | 6/2005 | Keane et al. ...................... 703/1 |
| 2007/0265815 A1* | 11/2007 | Couet et al. ...................... 703/10 |
| 2008/0255813 A1* | 10/2008 | Fine et al. .......................... 703/2 |
| 2009/0043547 A1* | 2/2009 | Kirby et al. ....................... 703/2 |

FOREIGN PATENT DOCUMENTS

GB 2405961 A 3/2005

OTHER PUBLICATIONS

Holmstrom, Kenneth "An Adaptive Radial Basis Algorithm (ARBF) for Expensive Black-Box Optimization" J. Glob. Optim. 41:447-464 Nov. 2007.*
Booker, A.J., et al. "A Rigorous Framework for Optimization of Expensive Functions by Surrogates" Strucutral Optimization, vol. 17, pp. 1-13 (1999).*
Jones, Donald R. "A Taxonomy of Global Optimization Methods Based on Response Surfaces" J. Global Optimization, vol. 21, pp. 345-383 (2001).*

(Continued)

*Primary Examiner* — Kamini S Shah
*Assistant Examiner* — Jay B Hann
(74) *Attorney, Agent, or Firm* — Alec J. McGinn; Colin L. Wier; Rodney Warfford

(57) ABSTRACT

A method for optimizing expensive functions with expensive nonlinear constraints. The method includes selecting sample data for evaluating an expensive function of a simulation, generating a function proxy model for the expensive function and a constraint proxy model for an expensive nonlinear constraint of the expensive function using an approximation scheme, calculating a first solution point for the simulation using the proxy models, and evaluating the expensive function at the first solution point using the sample data. When the expensive function and the proxy models do not converge at the first solution point, the method further includes adding the first solution point to the sample data for updating the proxy models. The method further includes repeating the calculation and evaluation of solution points until the expensive function and the proxy models converge and, following convergence, identifying an optimal solution of the function proxy model and the constraint proxy model.

19 Claims, 8 Drawing Sheets

(56) References Cited

OTHER PUBLICATIONS

Finkel, Daniel E. "Global Optimization with the DIRECT Algorithm" PhD Thesis, North Carolina State University (2005) available from <http://repository.lib.ncsu.edu/ir/handle/1840.16/4738>.*

Bjorkman, Mattias; Holmstrom, Kenneth "Global Optimization of Costly Nonconvex Functions Using Radial Basis Functions" Optimization and Engineering, vol. 1, pp. 373-397 (2000, revised 2001) available from <http://link.springer.com/article/10.1023%2FM/03A1 011584207202>.*

Hikita, Mitsunori, et al. "Reliability Optimization of Systems by a Surrogate-Constraints Algorithm" IEEE Transactions on Reliability, vol. 41, No. 3, (1992).*

Chen, L., et al. "Surrogate Constraint Method for Optimal Power Flow" IEEE Int'l Conf. on Power Industry Computer Applications, pp. 156-161 (1997).*

Holmstrom, Kenneth, Quttineh, Nils-Hassan, Edvall, Marcus M., "An adaptive radial basis algorithm (ARBF) for expensive black-box mixed-integer constrained global optimization" Jul. 2008.

Blizniouk, Nikolai, Ruppert, David, Shoemaker, Christine, Regis, Rommel, Wild, Stefan, Mugunthan, Pradeep, "Bayesian calibration of computationally expensive models using optimization and radial basis function approximation", Sep. 29, 2006.

Regis, Rommel G., Shoemaker, Christine A., "Constrained global optimization of expensive black box functions using radial basis functions", Jan. 2005.

Booker, Andrew J., et. al., "A rigorous framework for optimization of expensive functions by surrogates", National Aeronautics and Space Administration, NASA/CR-1998-208735, ICASE Report No. 98-47, Nov. 1998.

Rashid, Kashif, "Optimal allocation procedure for gas-lift optimization", Ind. Eng. Chem, Res. 2010, 49, pp. 2286-2294.

Brekelmans, Ruud, et al., "Constrained optimization involving expensive function evaluations: A sequential approach", CentER No. 2001-97, Nov. 2001, ISSN 0924-7815.

Dennis, et al., "Numerical Methods for Unconstrained Optimization and Nonlinear Equations", Prentice Hall, Inc., New Jersey, 1983, pp. 98-103.

Kamali, et al., "Hydrologic model calibration using fuzzy TSK surrogate model", 2005 Annual Meeting of the North American Fuzzy Information Processing Society, Jun. 26-28, 2005, pp. 799-803.

Pietrobom, et al., "Using surrogates to reduce time expenditure for optimization in systems and control", Proceedings of the 40th IEEE Conference on Decision and Control, vol. 4, Dec. 2001, pp. 3178-3183.

Press, et al., "Numerical Recipes in C: The Art of Scientific Computing", Cambridge University Press, 1993, pp. 304-309.

* cited by examiner

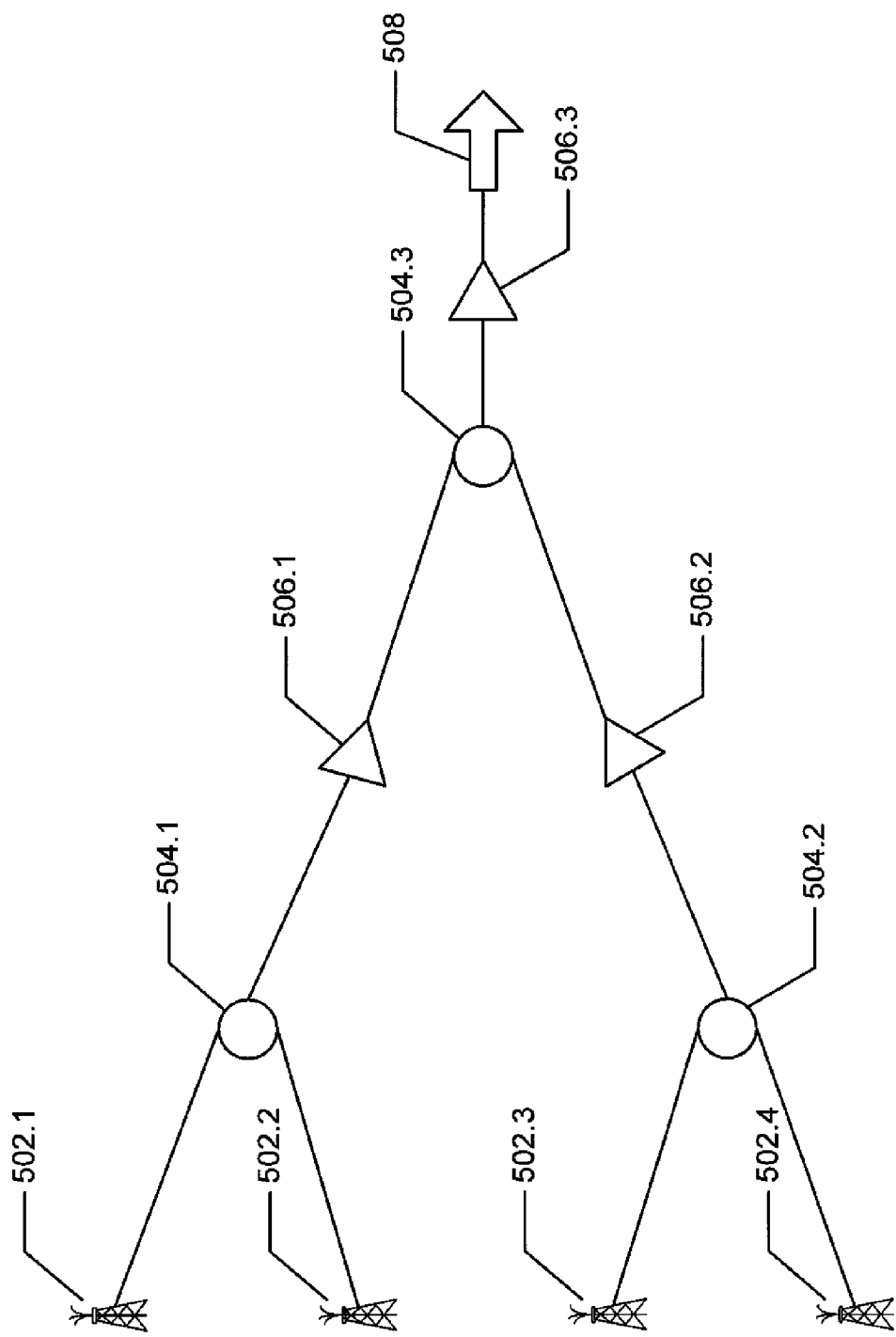
FIG. 5.1

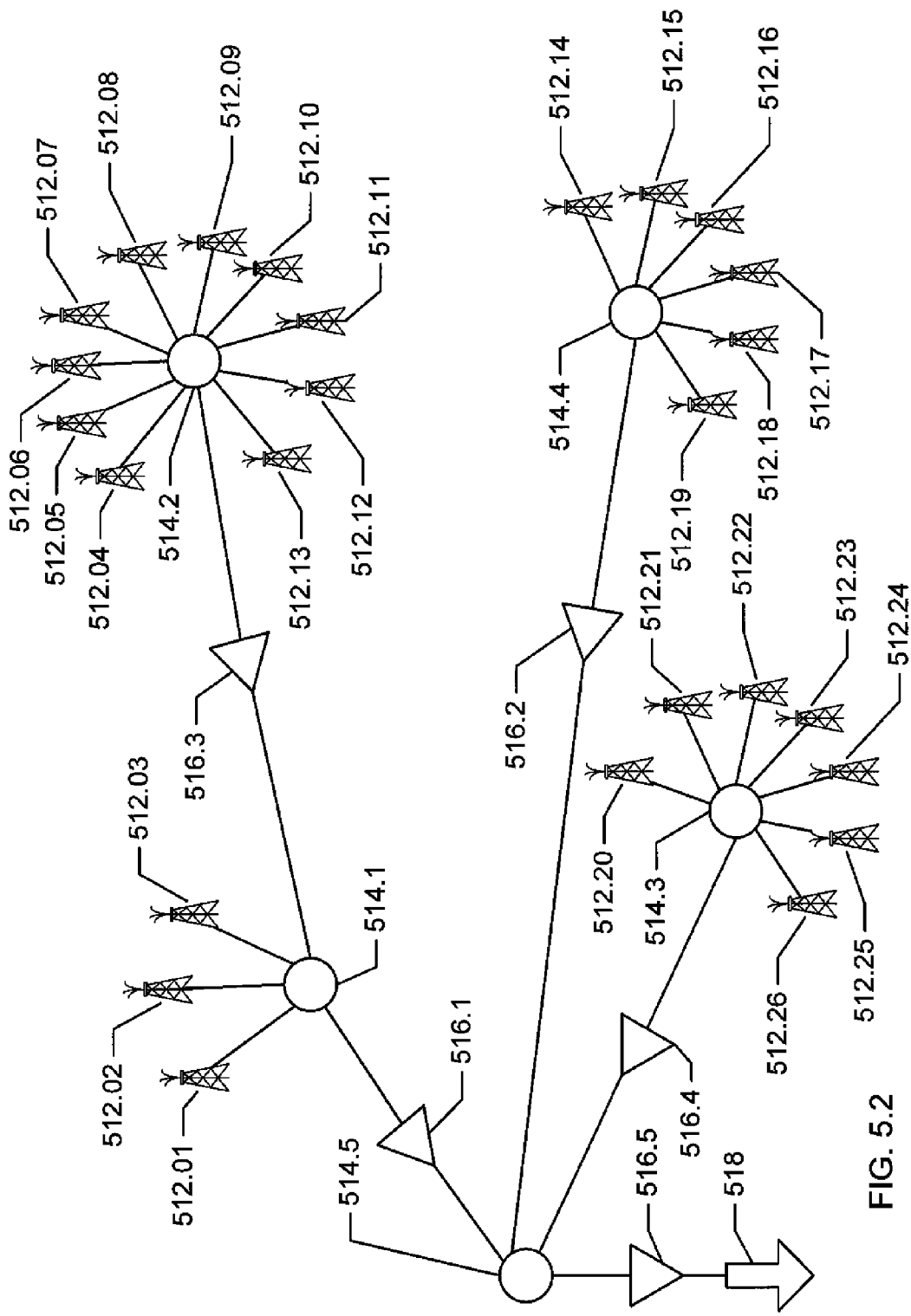
FIG. 5.2

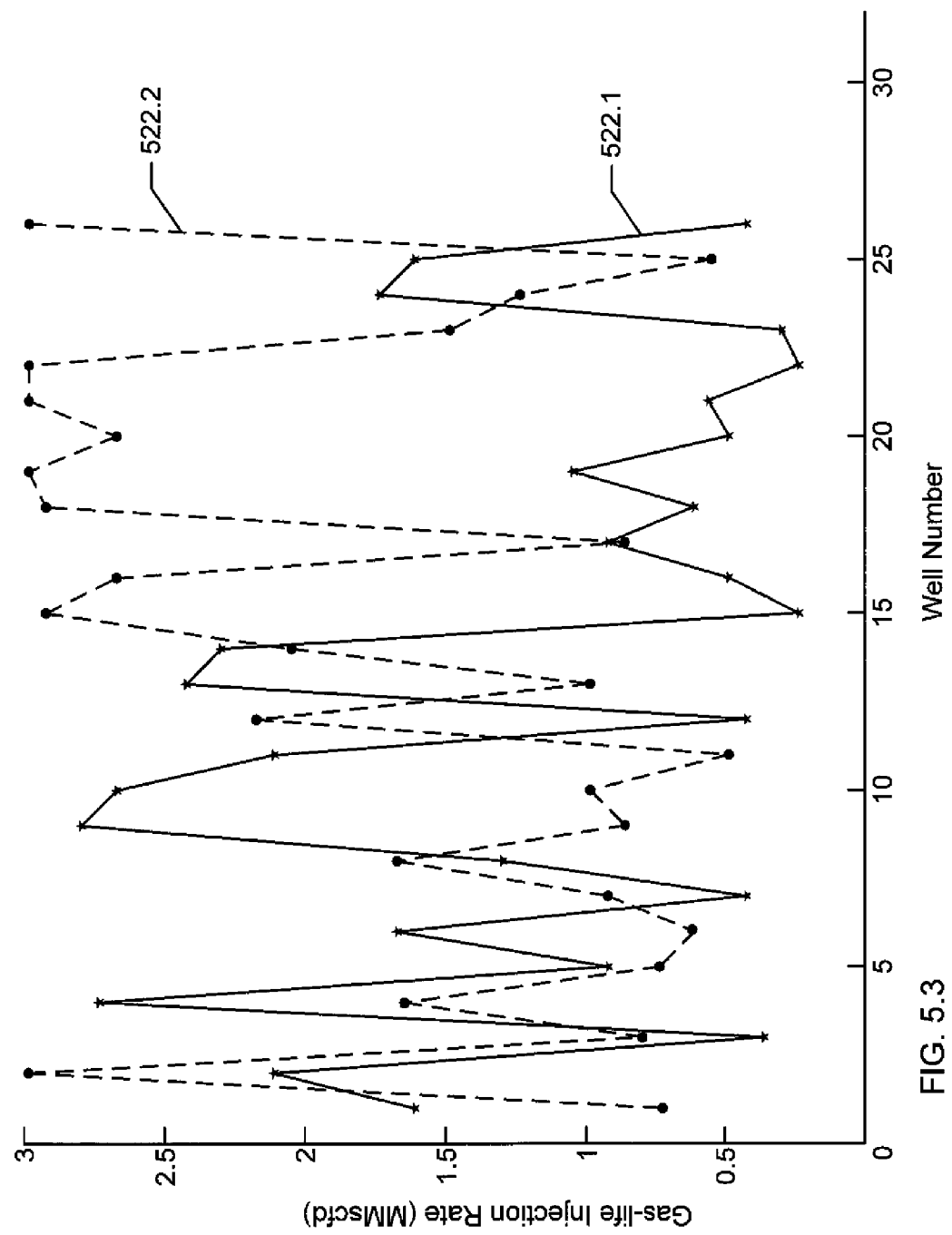
FIG. 5.3

PROXY METHODS FOR EXPENSIVE FUNCTION OPTIMIZATION WITH EXPENSIVE NONLINEAR CONSTRAINTS

CROSS-REFERENCE TO RELATED APPLICATION

This application claims priority, pursuant to 35 U.S.C. §119(e), to the filing date of U.S. Patent Application Ser. No. 61/314,342, entitled "Proxy Methods for Expensive Function Optimization with Expensive Nonlinear Constraints," filed on Mar. 16, 2010, which is hereby incorporated by reference in its entirety.

BACKGROUND

Typically, real-world optimization problems include objective functions that are based on the output of one or more simulation models. In this case, the underlying processes of the problems may be time and computation intensive, and the objective function is deemed expensive (i.e., central processing unit intensive) to evaluate. While methods to alleviate this cost in the optimization procedure have been explored, utilizing neural networks, splines, response surface methods and radial basis function approximations amongst others, less attention has been given to the treatment of expensive constraints.

SUMMARY

In one or more embodiments of optimizing expensive functions with expensive nonlinear constraints, the method includes selecting sample data for evaluating an expensive function of a simulation, generating a function proxy model for the expensive function and a constraint proxy model for an expensive nonlinear constraint of the expensive function using an approximation scheme, calculating a first solution point for the simulation using the proxy models, and evaluating the expensive function at the first solution point using the sample data. When the expensive function and the proxy models do not converge at the first solution point, the method further includes adding the first solution point to the sample data for updating the proxy models. The method further includes repeating the calculation and evaluation of solution points until the expensive function and the proxy models converge and, when after convergence, identifying an optimal solution of the function proxy model and the constraint proxy model.

Other aspects of proxy methods for expensive function optimization with expensive nonlinear constraints will be apparent from the following description and the appended claims.

BRIEF DESCRIPTION OF THE DRAWINGS

The appended drawings illustrate several embodiments of proxy methods for expensive function optimization with expensive nonlinear constraints and are not to be considered limiting of its scope, for proxy methods for expensive function optimization with expensive nonlinear constraints may admit to other equally effective embodiments.

FIGS. 5.1-5.3 depict example networks to be solved by using a radial basis function (RBF) or neural network (NN) approximation scheme (i.e., proxy) for expensive function optimization with expensive nonlinear constraints in accordance with one or more embodiments.

DETAILED DESCRIPTION

Figure 1:
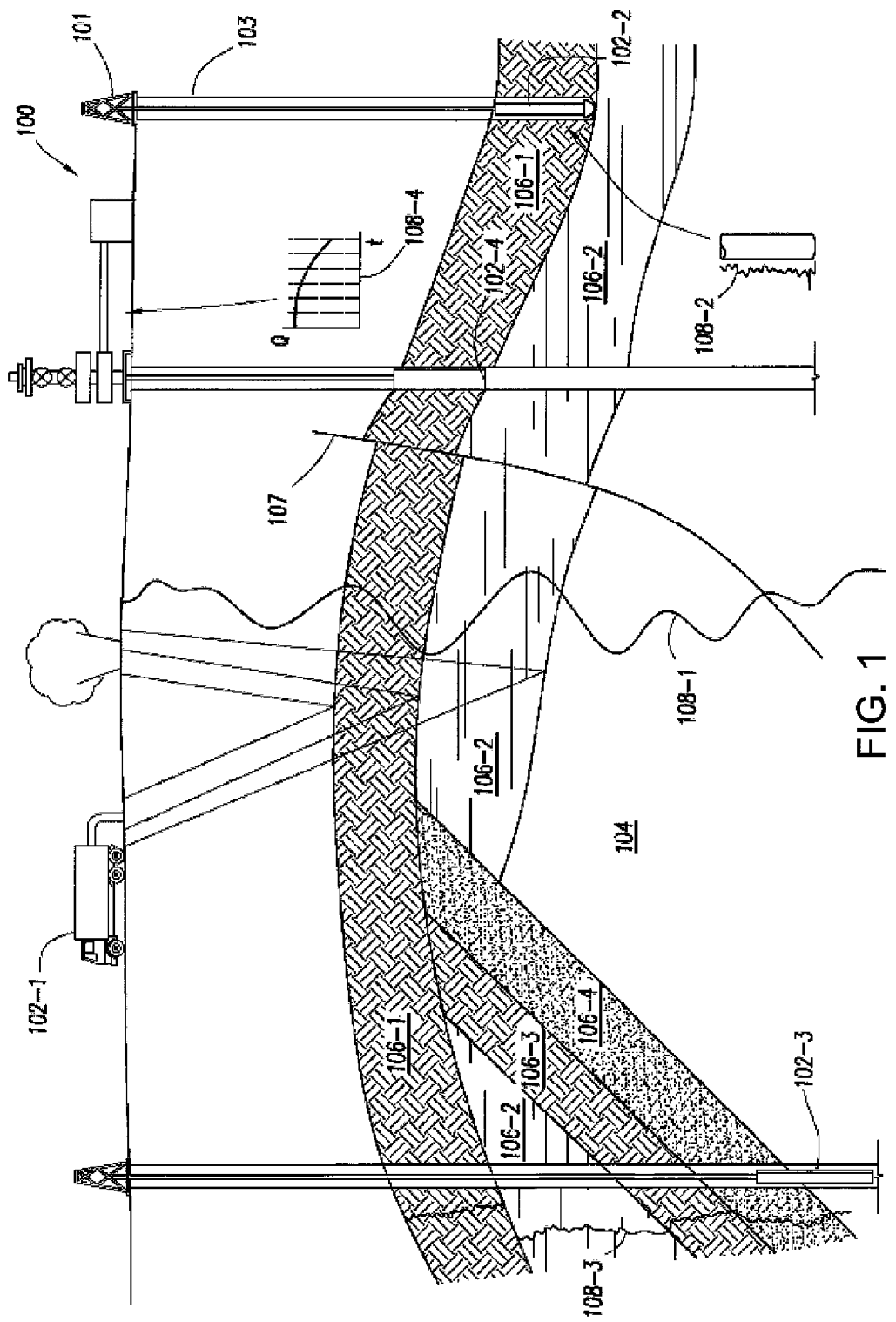
FIG. 1 depicts a schematic view, partially in cross-section, of a field having a plurality of data acquisition tools positioned at various locations along the field for collecting data from the subterranean formation, in which embodiments of proxy methods for expensive function optimization with expensive nonlinear constraints may be implemented.

Embodiments are shown in the above-identified drawings and described below. In describing the embodiments, like or identical reference numerals are used to identify common or similar elements. The drawings are not necessarily to scale and certain features and certain views of the drawings may be shown exaggerated in scale or in schematic in the interest of clarity and conciseness.

In one or more embodiments, proxy methods for expensive function optimization with expensive nonlinear constraints involve a methodology for treating expensive simulation-based constraints alongside an expensive simulation-based objective function using adaptive radial basis function or neural network techniques. For example, a radial basis function approximation scheme is developed not only to model the expensive function but also each expensive simulation-based constraint defined in a real-world optimization problem.

FIG. 1 depicts a schematic view, partially in cross section of a field (100) having data acquisition tools (102-1), (102-2), (102-3), and (102-4) positioned at various locations in the field for gathering data of a subterranean formation (104). As shown, the data collected from the tools (102-1 through 102-4) can be used to generate data plots (108-1 through 108-4), respectively.

As shown in FIG. 1, the subterranean formation (104) includes several geological structures (106-1 through 106-4). As shown, the formation has a sandstone layer (106-1), a limestone layer (106-2), a shale layer (106-3), and a sand layer (106-4). A fault line (107) extends through the formation. In one or more embodiments, the static data acquisition tools are adapted to measure the formation and detect the characteristics of the geological structures of the formation.

As shown in FIG. 1, a drilling operation is depicted as being performed by drilling tools (102-2) suspended by a rig (101) and advanced into the subterranean formations (104) to form a wellbore (103). The drilling tools (106b) may be adapted for measuring downhole properties using logging-while-drilling ("LWD") tools.

A surface unit (not shown) is used to communicate with the drilling tools (102-2) and/or offsite operations. The surface unit is capable of communicating with the drilling tools (102-2) to send commands to the drilling tools (102-2), and to receive data therefrom. The surface unit is preferably provided with computer facilities for receiving, storing, processing, and/or analyzing data from the oilfield. The surface unit collects data generated during the drilling operation and produces data output which may be stored or transmitted. Computer facilities, such as those of the surface unit, may be positioned at various locations about the oilfield and/or at remote locations.

Sensors, such as gauges, may be positioned about the oilfield to collect data relating to various oilfield operations as described previously. For example, the sensor may be positioned in one or more locations in the drilling tools (102-2) and/or at the rig (101) to measure drilling parameters, such as weight on bit, torque on bit, pressures, temperatures, flow rates, compositions, rotary speed and/or other parameters of the oilfield operation.

The data gathered by the sensors may be collected by the surface unit and/or other data collection sources for analysis or other processing. The data collected by the sensors may be used alone or in combination with other data. The data may be collected in one or more databases and/or transmitted on or offsite. All or select portions of the data may be selectively used for analyzing and/or predicting oilfield operations of the current and/or other wellbores. The data may be historical data, real time data or combinations thereof. The real time data may be used in real time, or stored for later use. The data may also be combined with historical data or other inputs for further analysis. The data may be stored in separate databases, or combined into a single database.

The collected data may be used to perform activities, such as wellbore steering. In another example, the seismic data output may be used to perform geological, geophysical, and/or reservoir engineering. In this example, the reservoir, wellbore, surface and/or process data may be used to perform reservoir, wellbore, geological, geophysical or other simulations. The data outputs from the oilfield operation may be generated directly from the sensors, or after some preprocessing or modeling. These data outputs may act as inputs for further analysis.

As shown in FIG. 1, data plots (108-1 through 108-4) are examples of plots of static properties that may be generated by the data acquisition tools (102-1 through 102-4), respectively. For example, data plot (108-1) is a seismic two-way response time. In another example, data plot (108-2) is core sample data measured from a core sample of the formation (104). In another example, data plot (108-3) is a logging trace. In another example, data plot (108-4) is a plot of a dynamic property, the fluid flow rate over time. Those skilled in the art will appreciate that other data may also be collected, such as, but not limited to, borehole imagery, historical data, user inputs, economic information, other measurement data, and other parameters of interest.

While a specific subterranean formation (104) with specific geological structures is depicted, it will be appreciated that the formation (104) may contain a variety of geological structures. Fluid, rock, water, oil, gas, and other geomaterials may also be present in various portions of the formation (104). Each of the measurement devices may be used to measure properties of the formation (104) and/or its underlying structures. While each acquisition tool is shown as being in specific locations along the formation (104), it will be appreciated that one or more types of measurement may be taken at one or more location across one or more fields or other locations for comparison and/or analysis using one or more acquisition tools. The terms measurement device, measurement tool, acquisition tool, and/or field tools are used interchangeably in this documents based on the context.

The data collected from various sources, such as the data acquisition tools of FIG. 1, may then be evaluated. Typically, seismic data displayed in the data plot (108-1) from the data acquisition tool (102-1) is used by a geophysicist to determine characteristics of the subterranean formation (104). Core data shown in plot (108-2) and/or log data from the well log (108-3) is typically used by a geologist to determine various characteristics of the geological structures of the subterranean formation (104). Production data from the production graph (108-4) is typically used by the reservoir engineer to determine fluid flow reservoir characteristics.

Figure 2:
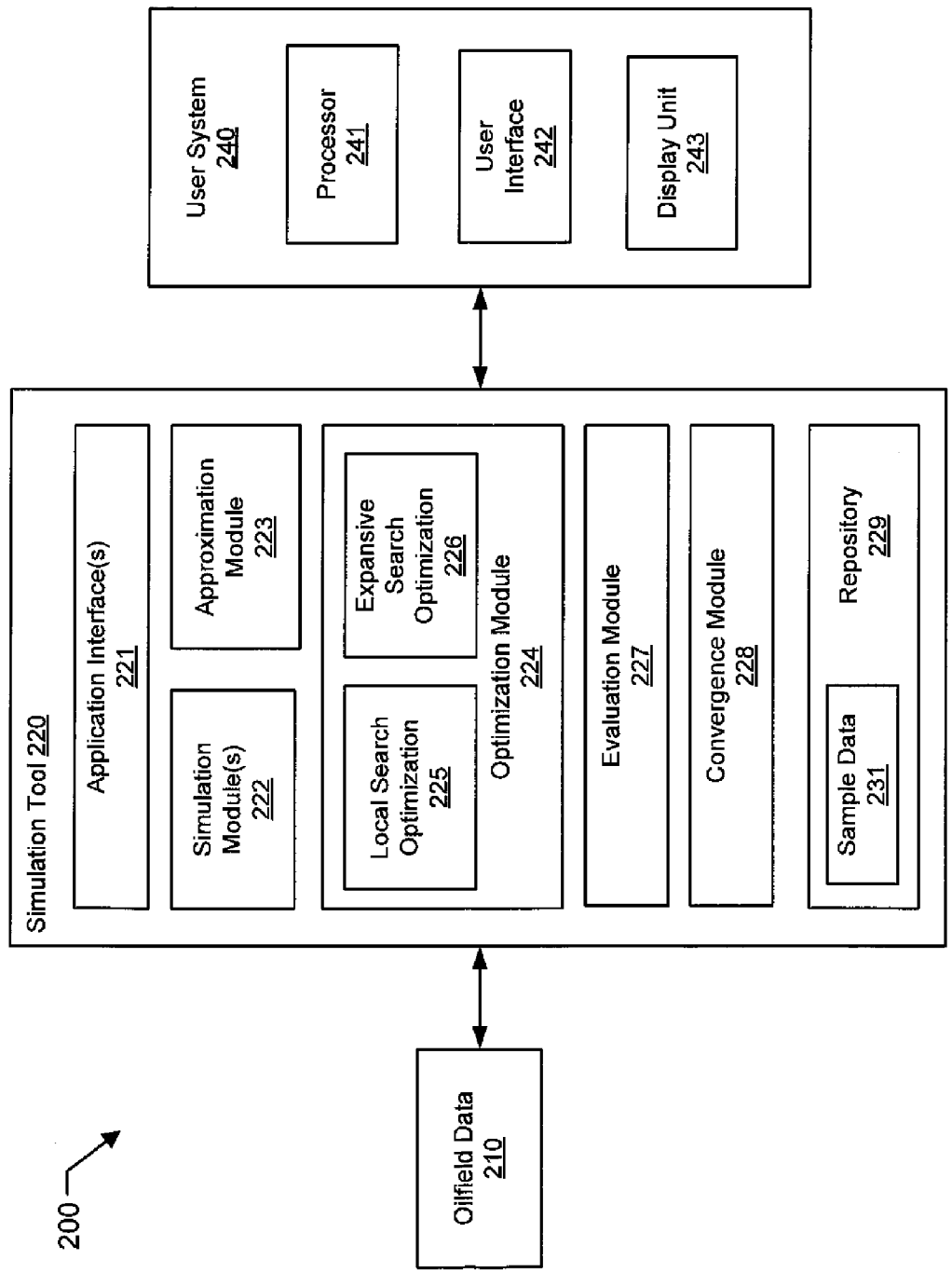
FIG. 2 depicts a system in which one or more embodiments of proxy methods for expensive function optimization with expensive nonlinear constraints may be implemented.

FIG. 2 shows a diagram of a system (200) for using proxy methods to optimize an expensive function with expensive nonlinear constraints. The system (200) includes a simulation tool (220), a user system (240), and oilfield data (210). The simulation tool (220) includes a repository (229), one or more application interfaces (221), simulation module(s) (222), a approximation module (223), an optimization module (224), a evaluation module (227), and a convergence module (228). The user system (240) includes a processor (241), a user interface (242), and a display unit (243). Each of these components is described in detail below. One of ordinary skill in the art will appreciate that embodiments are not limited to the configuration shown in FIG. 2.

In one or more embodiments, the simulation tool (220) is configured to interact with the oilfield data (210) and the user system (240) using one or more of the application interfaces (221). The application interfaces (221) may be configured to receive and transmit the oilfield data (210), transmit data to and receive data from the user system (240), and/or store data to the repository (229).

In one or more embodiments, the oilfield data (210) may be obtained by the data acquisition tool (102-1) depicted in FIG. 1 above. For example, the oilfield data (210) may be seismic data, core sample data, logging data, etc. for use throughout the system (200). As noted above, data in the forms of raw data, processed data, and/or data outputs generated from various data may be used. The oilfield data (210) and the user system (240) may be located in the same location or in separate locations, for example in a surface unit that may be positioned at various locations about the field (100) and/or at remote locations.

In one or more embodiments, the processor (i.e., central processing unit (CPU)) (241) of the user system (240) is configured to execute instructions to operate the components of the user system (240) (e.g., the user interface (242)).

In one or more embodiments, the user system (240) is configured to interact with a user (not shown) using the user interface (242). The user interface (242) may be configured to receive data and/or instruction(s) from the user. The user interface (242) may also be configured to deliver instruction(s) to the user. In addition, the user interface (242) may be configured to send data and/or instruction(s) to, and receive data and/or instruction(s) from, the simulation tool (220). The user may correspond to, but is not limited to, an individual, a group, an organization, or some other legal entity.

In one or more embodiments, a display unit (243) may be provided in the user system (240) for viewing data (e.g., oilfield data (210)). The data displayed by the display unit (243) may be raw data, processed data and/or data outputs generated from various data. In one or more embodiments, the display unit (243) is adapted to provide flexible views of the data, so that the screens depicted may be customized as desired. A user may plan, adjust, and/or otherwise perform field operations (e.g., determine the desired course of action during field operations) based on reviewing the displayed field data. The field operations may be selectively adjusted in response to viewing the data on the display unit (243). The display unit (243) may include a two-dimensional (2D) display or a three-dimensional (2D) display for viewing data or various aspects of the field operations.

The user system (240) may be, or may contain a form of, an internet-based communication device that is capable of communicating with the application interface (221) of the simulation tool (220). Alternatively, the simulation tool (220) may be part of the user system (240). The user system (240) may correspond to, but is not limited to, a desktop computer with internet access, a laptop computer with internet access, a smart phone, a personal digital assistant (PDA), or other user accessible devices.

As shown, communication links are provided between the simulation tool (220), the oilfield data (210), and the user system (240). A variety of links may be provided to facilitate the flow of data through the system (200). For example, the communication links may provide for continuous, intermittent, one-way, two-way, and/or selective communication throughout the system (200). The communication links may be of any type, including, but not limited to, wired and wireless.

In one or more embodiments, the simulation tool (220) includes simulation module(s) (222) configured to perform simulations of reservoirs and/or field operations as discussed above with respect to FIG. 1. More specifically, the simulation module(s) (222) may be configured to optimize a problem (e.g., minimize or maximize an objective function given a set of tuneable parameters, the control variables). Examples of optimization problems include, but are not limited to, a gas-lift optimization problem to allocate a fixed amount of lift gas among a number of wells to improve production and a reservoir model optimization problem to maximize cumulative oil.

In one or more embodiments, the simulation tool (220) includes a approximation module (223) configured to generate proxy models of expensive functions and nonlinear constraints. The approximation module (223) may generate proxy models using either a neural network ("NN") or radial basis function ("RBF") approximation. In this case, the approximation module (223) may be configured to use learning schemes to generate the proxy models. Additional details of the approximation module (223) are described in reference to FIGS. 3-4 below.

In one or more embodiments, the simulation tool (220) includes an optimization module (224) configured to optimize proxy models generated by the approximation module. The optimization module (224) may include both a local search optimization step (225) and an expansive search optimization step (226). The local search optimization (225) may be configured to solve and evaluate a local search optimization problem using the proxy models generated by the approximation module (223). The local search optimization problem may be solved using sample points outside a radius of exclusion of a minimum distance. The expansive search optimization (226) may be configured to solve and evaluate a expansive search optimization problem using the proxy models generated by the approximation module (223). The expansive search optimization problem may be solved using sample points outside a radius of exclusion starting at a maximum distance, where the radius of exclusion iteratively decays to the minimum distance. Additional details of the optimization module (224), local search optimization (225), and expansive search optimization (226) are described in reference to FIGS. 3-4 below.

In one or more embodiments, the evaluation module (227) is configured to evaluate a real problem (i.e., original unoptimized function) at the solution points obtained by the optimization module (224). The evaluation module (227) may be configured to evaluate the real problem using penalty function values obtained by applying a penalty function to sample points, or some similar method thereof (e.g. based on a lexicographic order scheme). In this case, the evaluation module (227) may be configured to identify the solution point to be used in the next iteration of the optimization conducted by the optimization module (224). Additional details of the evaluation module (227) are described in reference to FIGS. 3-12 below.

In one or more embodiments, the convergence module (228) is configured to determine convergence between the real problem and the proxy optimization problem. More specifically, the convergence module (228) may be configured to determine whether the real problem and the proxy models converge at a solution point identified by the evaluation module (227). The simulation tool (220) may be configured to continue to iteratively optimize the real problem until the convergence module (228) indicates that the convergence conditions are satisfied. Additional details of the convergence module (228) are described in reference to FIGS. 3-12 below.

In one or more embodiments, a central processing unit (CPU, not shown) or other hardware processor of the simulation tool (220) is configured to execute instructions to operate the components of the simulation tool (220) (e.g., repository (229), the simulation module(s) (222), the approximation module (223), the optimization module (224), and the evaluation module (227)). In one or more embodiments, the memory (not shown) of the simulation tool (220) is configured to store software instructions for using the components of the simulation tool (220) to determine a position and/or thickness of a subterranean geological layer. The memory may be one of a variety of memory devices, including but not limited to random access memory (RAM), read-only memory (ROM), cache memory, and flash memory. The memory may be further configured to serve as back-up storage for information stored in the repository (229).

In one or more embodiments, the simulation tool (220) is configured to obtain and store data in the repository (229). In one or more embodiments, the repository (229) is a persistent storage device (or set of devices) and is configured to receive and/or deliver the oilfield data (210) and/or receive data from and/or deliver data to the user system (240) using the application interface (221). The repository (229) may be a data store (e.g., a database, a file system, one or more data structures configured in a memory, an extensible markup language (XML) file, some other medium for storing data, or any suitable combination thereof), which may include information (e.g., historical data, user information, field location information) related to the collection of field data (e.g., oilfield data (210)) for a field (100). The repository (229) may be a device internal to the simulation tool (220). Alternatively, the repository (229) may be an external storage device operatively connected to the simulation tool (220).

In one or more embodiments, the simulation tool (220) is configured to interact with the user system (240) using the application interface (221). The application interface (221) may be configured to receive data and/or instruction(s) from the user system (240). The application interface (221) may also be configured to deliver instruction(s) to the user system (240). In addition, the application interface (221) may be configured to send data and/or instruction(s) to, and receive data and/or instruction(s) from, the repository (229) and/or the oilfield data (210).

In one or more embodiments, the data transferred between the application interface (221), the repository (229), and/or the oilfield data (210) corresponds to field data, such as seismic data and/or various templates/models of the field (100). In one or more embodiments, the simulation tool (220) is configured to support various data formats provided by the oilfield data (210) and/or the user system (240).

The simulation tool (220) may include one or more system computers, which may be implemented as a server or any conventional computing system However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the simulation tool (220), it will be appreciated that a variety of components with various functions may be used to provide the formatting, processing, utility and coordination functions necessary to modify the sample data (229) in the simulation tool (220). The components may have combined functionalities and may be implemented as software, hardware, firmware, or combinations thereof.

Figure 3:
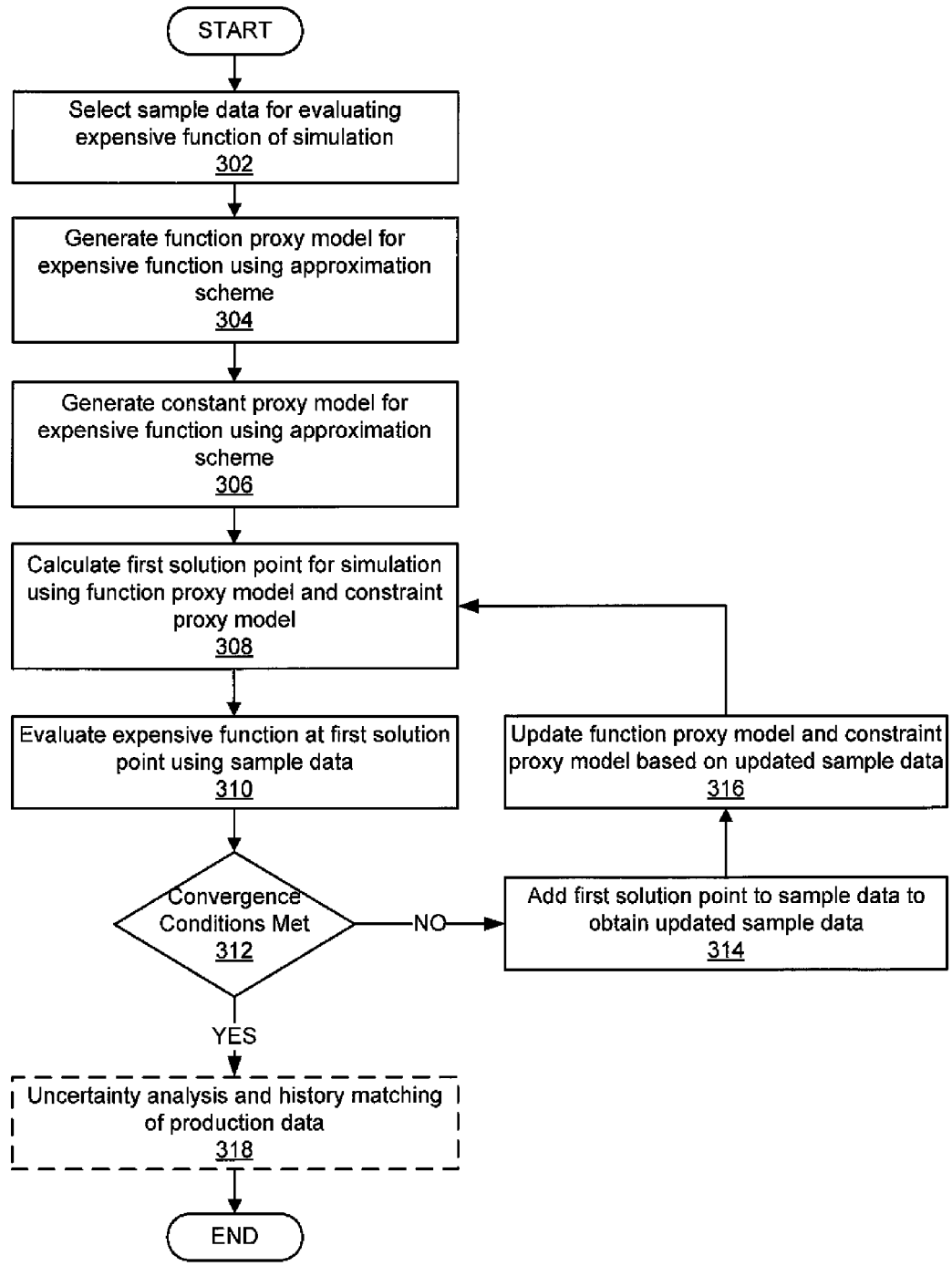
FIGS. 3-4 depict example methods for proxy methods for expensive function optimization with expensive nonlinear constraints in accordance with one or more embodiments.

FIG. 3 depicts an example method for using proxy methods to optimize an expensive function with expensive nonlinear constraints. For example, the method depicted in FIG. 3 may be practiced using the system (200) described in reference to FIG. 2 above. In one or more embodiments of the invention, one or more of the elements shown in FIG. 3 may be omitted, repeated, and/or performed in a different order. Accordingly, embodiments of proxy methods for expensive function optimization with expensive nonlinear constraints should not be considered limited to the specific arrangements of elements shown in FIG. 3.

In one or more embodiments, a general optimization problem is defined by the following:

$$\min F(X) \quad (1)$$

$$\text{s.t. } G(X) \leq 0$$

$$H(X) = 0$$

$$\text{with } X \in R^N$$

Where G(X) is the set of J inequality constraints and H(X) is the set K of equality constraints.

In the general optimization problem, constraints may be partitioned into inexpensive and expensive constraints. Inexpensive constraints may be evaluated trivially, while expensive constraints are simulation dependent and are, thus, deemed costly to evaluate. Hence, the optimization problem can be defined by the following:

$$\min F(X) \quad (2)$$

$$\text{s.t. } G_I(X) \leq 0$$

$$G_E(X) \leq 0$$

$$H_I(X) = 0$$

$$H_E(X) = 0$$

$$\text{with } X \in R^N$$

Where the subscripts I and E refer to inexpensive and expensive constraints, respectively. In this case, the objective function F(X) is considered expensive to evaluate in problems (1) and (2).

In one or more embodiments, each expensive equality constraint is replaced by two associated inequality constraints using partial relaxation. For example, the following two expensive inequalities are defined for the original expensive equality constraint $h_i(X)$:

$$g_{i1}(X): h_i(X) + \epsilon \leq 0 \quad (3)$$

$$g_{i2}(X): \epsilon - h_i(X) \leq 0$$

with $\epsilon = 5e-5$.

Note that any inexpensive equality constraint can be similarly replaced if so desired. In this case, the general optimization problem is related to the optimization of an expensive objective function with both expensive and inexpensive inequality constraints, together with the inexpensive equality constraints, depending on the problem specification given by the following:

$$\min F(X) \quad (4)$$

$$\text{s.t. } G_I(X) \leq 0$$

$$G_E(X) \leq 0$$

$$H_I(X) = 0$$

$$\text{with } X \in R^N$$

Where $G_I(X)$ and $G_E(X)$ are the inexpensive and expensive inequality constraints, respectively, and $H_I(X)$ is the inexpensive equality constraint set. In this example, the bound (i.e., box) constraints are included in the set of inexpensive constraints given by the following:

$$X_i^l - X_i \leq (5)$$

$$X_i - X_i^u \leq 0$$

$$i \in [1, N]$$

Where N is the problem dimensionality (i.e., number of variables) and $X^l$ and $X^u$ define the lower and upper bounds of the i-th variable, respectively.

Returning to the method of FIG. 3, in element 302, sample data is selected for initial evaluation of an expensive simulation-based function. For example, the sample data may be based on N+1 samples, where N is the number of control variables in the problem and the additional sample ensures a linear approximation is obtained. In another example, the sample data may be based on N+2 samples, or some other sampling scheme and number thereof. The sample points may be oilfield data (210) as discussed above with respect to FIG. 2. In one or more embodiments, the expensive function may be evaluated at each sample point in the sample data. The expensive function may be the output of a simulation that requires a significant amount of processing time, where the simulation includes the control of both continuous and discrete valued variables, under many operating constraints.

In element 304, a function proxy model is generated for the expensive function using an approximation scheme. In one or more embodiments, the approximation scheme may be a neural network ("NN") approximation scheme or an RBF approximation scheme. An example RBF approximation is described below with respect to FIG. 4. In the case of the NN approximation scheme, the NN may include an output for each modeled quantity of the simulation. In element 306, constraint proxy model(s) are generated for each of the expensive constraint(s) in the optimization problem using the same approximation scheme described above. Note that the generation of the expensive constraint(s) implies that the nonlinear constraint values are also gathered at each of the initial samples.

In one or more embodiments, the adaptive radial basis function ("RBF") approximation scheme is employed to model the objective function (F(X)) and each of the expensive inequality constraints ($G_E(X)$). Radial basis functions may be used for the purpose of global approximation, using for example, a set of M data points D=[X Y], where $D_i$=[X Y]$_i$ is the i-th sample point, with X$\in$R$^N$ and Y=F(X)$\in$R$^1$. In this example, X has dimensionality N and Y is a scalar.

In one or more embodiments, the RBF approximation may be defined by the following:

$$\hat{F}(X) = \sum_{i=1}^{M} C_i \Phi(r) \quad (6)$$

The coefficients $C_i$ in (6) are chosen such that: $\hat{F}(X_i)$=F($X_i$), for $X_i \in$D. In addition, $\Phi(r)$ is the radial basis function, with r=||X−$X_i$||. In this case, r defines the Euclidean distance of a given point X in the search space from the i-th basis function center.

The coefficients C are determined by the solution of a linear system defined by:

$$AC=Y \quad (7)$$

Where C$\in$R$^{Mx1}$, Y$\in$R$^{Mx1}$ and A$\in$R$^{MxM}$ is a square matrix of radial basis functions with component $\Phi_{ij}$ (i.e., the element in the i-th row and j-th column) indicating the radial basis function evaluated with center $X_j$ from point $X_i$. In this example, $\Phi_{ij}$ is the same as $\Phi_{ji}$, because the square matrix is symmetric; thus, the coefficients may be obtained by linear inversion:

$$C=A^{-1}Y \quad (8)$$

Note that for a neural network model, a regression problem is solved using established gradient techniques, e.g. back-propagation or Levenberg-Marquardt methods.

At this stage, the approximating function value is obtained using equation (6) for any given X.

In one or more embodiments, a number of radial basis function types may be selected including, but not limited to:

Gaussian $\Phi(r, p) = \exp(-pr^2)$ (9)

Multiquadric $\Phi(r, p) = sqrt(r^2 + p^2)$ (10)

Inverse Multiquadric $\Phi(r, p) = \dfrac{1}{sqrt(r^2 + p^2)}$ (11)

Cubic $\Phi(r, p) = (r + p)^3$ (12)

Thin plate spline $\Phi(r, p) = r^2 \ln(pr)$ (13)

Each radial basis function type is defined as a function of r and a tuning parameter p. The parameter p may have a number of interpretations. For example, in the case of the Gaussian RBF, the parameter p is a measure of spread. In another example, the parameter p is the shift parameter for the multiquadric RBF and may be selected as the mean distance between the points in the dataset D. In this example, the choice of parameter is governed by the number and location of samples in D and may be difficult to obtain or establish optimally. In one or more embodiments, the parameter is selected by means of minimization of an error function based on the partition of the dataset. In this case, it is assumed that D is sufficiently large to provide a suitably sized subset of data for testing. Those skilled in the art will appreciate that when the dataset is sparse, further processing may be required to obtain a practical choice of parameter p.

In one or more embodiments, the multiquadric ("MQ") RBF (10) may be used, which from empirical evidence is appropriate when there is a limited amount of data, as is often the case with expensive simulation-based models. In particular, to train the MQ-RBF system we establish the highest value of p that ensures the sample points can be reproduced within a desired tolerance. This method of training is referred to as the HighP scheme.

In general, the benefits of a RBF approximation scheme may be summarized by the following:
  The coefficients are obtained from simple linear inversion
  The function values are exact at the training points
  Training is extremely fast, with a low computational cost
  The resulting approximation can be more accurate compared to neural network based schemes However, some difficulties associated with RBF approximations may be summarized by the following points:
  Choice of radial basis function is often unclear
  Choice of tuning parameter p is unclear
  Singularity of the linear system arises if duplicate (i.e., coincident) points are present in the dataset
  The size of D may affect the inversion performance
  Possible need to create a testing set for training purposes In one or more embodiments, adaptive radial basis function techniques may be used to solve optimization problems with expensive simulation-based constraints and objective function. In this case, the adaptive radial basis function techniques may be subject to an upper bound on the RBF matrix condition number (i.e., the worst state permissible for the linear system).

In element 308, a first solution point for the simulation is calculated using the function proxy model and the constraint proxy model. More specifically, the optimization problem may be solved using the proxy models generated in elements 304 and 306. In addition, solution points may be calculated for both a local search optimization and an expansive search optimization as discussed below with respect to FIG. 4.

In element 310, the expensive function (i.e., real function) is evaluated at each of the solution points of element 308 from the sample data. More specifically, the expensive function is evaluated directly using a sample point corresponding to the solution point from the proxy model obtained using the sample data available. The results of the evaluation of the expensive function may then be compared to the solution point calculated in element 308.

In element 312, a determination is made as to whether convergence conditions are satisfied. Specifically, the convergence conditions are satisfied when the evaluation of the expensive function in element 310 converges with the solution point obtained in element 308. If the convergence conditions are not satisfied, the new solution points are added to the sample data store to obtain updated sample data (element 314). Next, in element 316, the function proxy model and constraint proxy models are updated based on the updated sample data set. At this stage, elements 308 to 316 may be repeated until the convergence conditions are satisfied. If the convergence conditions are satisfied, an optimal solution based on the function proxy model and constraint proxy models may be returned (element 318). At this stage, the optimal solution may be used to adjust and/or perform field operations as discussed above with respect to FIG. 1.

Figure 4:
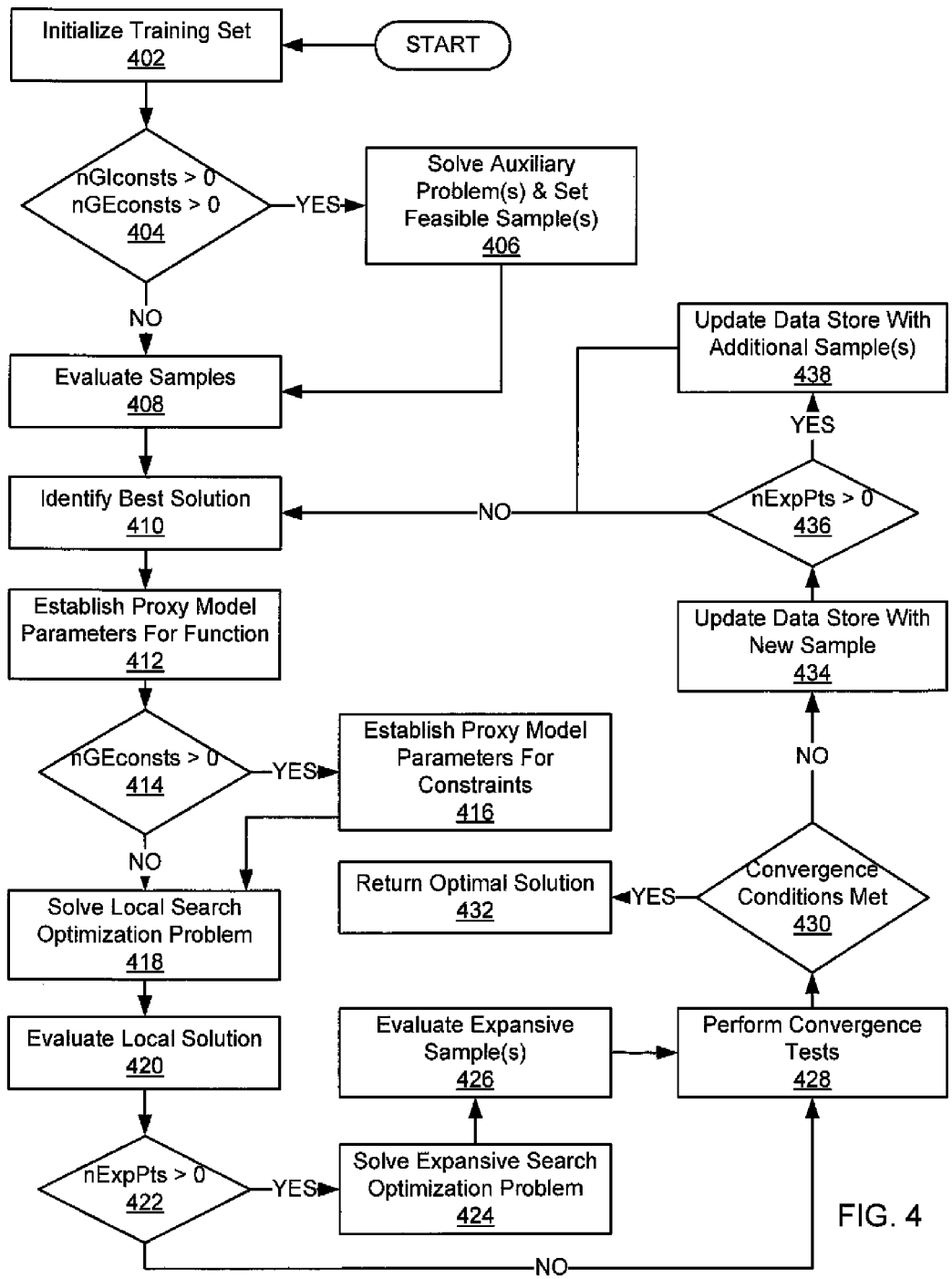

FIG. 4 depicts an example method for using a radial basis function approximation scheme for expensive function optimization with expensive nonlinear constraints. For example, the method depicted in FIG. 4 may be practiced using the system (200) described in reference to FIG. 2 above. In one or more embodiments of the invention, one or more of the elements shown in FIG. 4 may be omitted, repeated, and/or performed in a different order. Accordingly, embodiments of using proxy methods for expensive function optimization with expensive nonlinear constraints should not be considered limited to the specific arrangements of elements shown in FIG. 4.

In element 402, the adaptive iterative procedure is initialized with a starting dataset. For example, the starting dataset may be based on N+1 samples, where N is the number of control variables in the problem and the additional sample ensures a linear approximation. In another example, the starting dataset may be based on N+2 samples, or some other sampling scheme thereof. In the N+2 scheme, the samples are selected to include the base point (at which all the variables take their lower values), the extreme point (at which all variables take their highest values) and the N points that result when one variable is set to its upper value from the base point. In the case that N=2, the sample selection is the same as a corner point sampling and has been adopted to provide a minimum number of samples while ensuring a non-linear approximation is obtained from the outset. Those skilled in the art will appreciate that N+1 is the minimum number of samples required to create a linear approximation. Note that as the initial samples are independent of each other, the initial samples can be evaluated in parallel if that provision is available, using an evaluation module (228) and processor(s) (241) as discussed above with respect to FIG. 2.

In element 404, a determination is made as to whether the problem includes inexpensive and expensive constraints. If it is determined that the initial dataset is infeasible with respect to the inexpensive constraints present, an auxiliary optimization problem is solved to ensure the dataset becomes feasible (element 406). In this case, the dataset may be considered feasible if it conforms to all the inexpensive constraints of the specified expensive function.

In element 408, the initial sample set is evaluated with calls to an actual simulation model. The data gathered is representative of the expensive functions under investigation and is stored in a tabular set [X F(X) GE(X) GI (X) HI (X)]. In this case, the gathered data may be subsequently used to build RBF approximators (described below in elements 412 and 416) of the desired expensive functions and constraints. For example, the gathered data may be used to build RBF approximators according to problem (4) discussed above.

In element 410, the current best solution to the problem is identified. A penalty function P(X) may be evaluated for each point in the data set, with one such example given by the following $$P(X) = F(X) + \lambda \left[ \sum_{j=1}^{J} w_u \max(0, g_j(X))^2 + \sum_{k=1}^{K} w_k (h_k(X))^2 \right] \quad (14)$$

Where J is the total number of inequality constraints (expensive and inexpensive), K is the total number of inexpensive equality constraints, $\lambda$ is the penalty multiplier, while $w_j$ and $w_k$ are the associated weights of the inequality and equality constraints, respectively. For example, where $\lambda$=1e6, $w_j$=1 and $w_k$=1, the penalty and weights are invariant, though the penalty and weights may be modified if considered necessary. Those skilled in the art will appreciate that the penalty function provides a metric of comparison and is not used as the basis of approximation itself because an active constraint is difficult to model with a penalty formulation due to the choice of multipliers and the location of sample points in the search space. The penalty values may be used for comparative purposes to identify the best solution when constraints are present, as will be described in additional detail below.

In element 412, proxy model parameters are established for the function. For training, the multiquadric RBF type is selected and the RBF parameter value is chosen so as to provide the smoothest approximation while ensuring the RBF matrix remains non-singular, using the HighP training scheme discussed above. In this case, the coefficient array of the RBF system of the objective function is obtained and stored for subsequent use. In element 414, a determination is made as to whether any expensive constraints exists. If expensive constraints do exist, proxy model parameters are also established for the expensive constraints (element 416), again using the HighP training scheme.

Once the RBF approximations are obtained for each expensive quantity, two optimization problems are solved. In element 418, the first optimization problem (as shown below in problem (15)) optimizes the approximation of the objective function ($\hat{F}(X)$) with one supplementary constraint to limit the distance of the solution point to any existing point by a minimum separation distance. The supplementary constraint prevents the RBF matrix from becoming singular. In element 422, a determination is made as to whether the number of expansive points is greater than zero. If the radius of decay is greater than the minimum distance possible, the same problem as the first optimization problem is solved but with a much larger radius of exclusion in the second optimization problem (as shown below in problem (16)) (element 424). The second optimization problem provides a more expansive search by selecting points farther away from all other sample points. In addition, as above, the larger radius of exclusion prevents the matrix from becoming singular. In one or more embodiments, expansive search problems may be solved on demand (i.e., solved as expansive search solutions are desired). In this case, the expansive search problems can be solved in parallel, if that provision is available. Those skilled in the art will appreciate that as, in the extreme case, the problem posed may have no feasible solution, the point that minimizes the level of constraint violation is instead returned. In this case, the solution point can be construed as the minimum of a penalty function in which no feasible region exists.

The optimization problems yield at least two solutions, a local solution ($X_L$) and one or more expansive solutions ($X_E$). The optimization problems may be solved simultaneously if, for example, a multi-core architecture is used. If $X_L$ and $X_E$ are sufficiently far apart (tested by a distance metric) the new solution candidates are obtained by repeating, at least, elements 410 through 424 as discussed above. At each iteration, the radius of exclusion decays exponentially towards the minimum distance possible as determined in element 422. Once the radius of exclusion decays to the minimum distance possible, only the local optimization problem is solved and only one new solution point is returned. In one or more embodiments, the MATLAB® Fmincon solver (i.e., a sequential quadratic programming (SQP) based solver) is used to solve problems (15) and (16) below with a multi-start procedure using a set of randomly generated starting conditions. MATLAB® is a registered trademark of Mathworks, Inc. located in Natick, Mass. Alternatively, any suitable nonlinear programming method, such as the Augmented Lagrangian method, SQP solver, or even derivative-free or global stochastic search schemes (e.g., downhill simplex method, genetic algorithm or simulated annealing, etc.) may be used to solve problems (15) and (16). In addition, in the event that mixed-integer control variables have been assigned, a dedicated mixed-integer nonlinear programming (MINLP) solver may be used.

(Local Search) $\min \hat{F}(X)$ (15)

s.t. $G_I(X) \leq 0$ $\hat{G}_E(X) \leq 0$ $H_I(X) = 0$ $D_{con}d(X) \leq 0$ $D_{con} = D_{min}$ (Expansive Search) $\min \hat{F}(X)$ (16)

s.t. $G_I(X) \leq 0$ $G_I(X) \leq 0$ $\hat{G}_E(X) \leq 0$ $H_I(X) = 0$ $D_{con} - d(X) \leq 0$ $D_{min} \leq D_{con} \leq D_{max}$ Where $\hat{F}(X)$ and $\hat{G}(X)$ represent the RBF approximations of the expensive objective function and the set of expensive inequalities, respectively, Dcon is the distance constraint value indicating the radius of exclusion with lower bound Dmin and upper bound Dmax, and d(X) is the Euclidean distance of the solution point X to any other point in the dataset.

In elements 420 and 426, the new solution points are evaluated to obtain the associated objective function and constraint values, respectively. The solution points can be evaluated in parallel using evaluation module (227) and processor(s) (241) as discussed above with respect to FIG. 2 if that provision is available, as the new samples are independent of each other. As discussed above in element 410, the penalty function values are calculated and used to identify which of the solutions will be set as the next point in the iterative scheme. The next point in the interative scheme is used in the convergence tests discussed below, which compare the best solution of all samples ($X^{best}$) to the best of the current iterate ($X^{next}$). In the case where only one expansive search is made, $X^{next}$ is the better of ($X_L, X_E$) defined as the $\min(P_L(X), P_E(X))$. In element 428, the next candidate point of interest is used in the convergence tests, which are performed after the convergence metrics are calculated. A similar approach is used if more than one expansive search is made (i.e., more than one additional sample is introduced at each iteration).

Before performing the convergence tests, a determination is made as to whether the current solution is better than the best solution found in previous iterations, where the best solution is updated accordingly for the current iteration. Then, several convergence criterion metrics may be calculated including, but not limited to, (1) checking whether the approximation has converged to the function value at $X^{next}$, (2) measuring if the current solution is in a close neighborhood of the best solution found so far, (3) determining whether the algorithm samples are in the same neighborhood as in the last iteration, and (4) determining whether the best solution found so far has changed in the current iteration. In this case, the optimization does not stop if any one of the convergence conditions are met. Rather, the conditions that are satisfied are counted for the consecutive iterations, and the optimization stops if the count reaches a pre-specified value. For example, in order to prevent the optimization from converging prematurely, the optimization may be allowed to run at most fifteen iterations without an improvement in the best solution. In this example, as two samples are obtained in each iteration, the number of function calls taken before the convergence conditions are satisfied may be anywhere between fifteen to thirty. Those skilled in the art will appreciate that any number and type of metrics may be adopted for convergence testing, with user input (242) as discussed above with respect to FIG. 2 according to target requirements (i.e., solution precision and affordable time or computational cost).

The data store arrays are updated [X, F(X), GE(X), GI(X), HI(X), P(X)] to include the $X_L$ solutions (element 434). If it is determined that expansive samples were obtained (element 436), the $X_E$ solutions (element 438) are also included in the data store arrays. The penalty factor and constraint multipliers ($\lambda$, $w_j$, $w_k$) may also be updated if necessary, which additionally necessitates the clearance of the P(X) array. The P(X) array is re-evaluated during the next iteration in any case.

In element 410, the best solution point $X^{best}$ is identified over all the samples in the data set using P(X) as the metric of comparison. The identification returns the best known solution in the dataset [$X^{best}$, $F^{best}$, $G_I^{best}$, $G_E^{best}$, $H_I^{best}$, $P^{best}$], which is, by default, representative of the simulation model under investigation, because the best known solution is an actual sample point.

At each iteration, the performance metrics are also stored and the procedure is repeated from the RBF model building step, unless the convergence conditions have been met (element 430), in which case the best solution identified ($X_{best}$) is returned (element 432).

In the following sections, results for several analytical and simulation-based test cases are presented, in which both the objective function and constraints are considered expensive.

FIG. 5.1 depicts an example network to be solved by using a radial basis function approximation scheme for expensive function optimization with expensive nonlinear constraints. The example network comprising four wells (502.1, 502.2, 502.3, 502.4), manifold nodes (504.1, 504.2, 504.3), and a sink node (508). The connecting lines are branches (506.1, 506.2, 506.3) and each well (502.1, 502.2, 502.3, 502.4) is associated with a pressure specified boundary condition.

The optimization problem of the example network is defined by the following:

$\max F(X) = NET(X)$ (17)

s.t. $\sum_{i=1}^{N} X_i \leq 4$ $0.2 \leq X_i \leq 3.0$ $i \in [1,2,3,4]$

Where $X_i$ is the i-th control variable and the objective function F is the liquid rate at the network sink. In this example, four million standard cubic feet per day of lift-gas are available for allocation. The optimal solution details as obtained using the method discussed with reference to FIGS. 3-4 are shown below:

nDims=4 (18)

nGIconsts=1 lowerbounds=[0.1 0.1 0.1 0.1]

upperbounds=[2.0 2.0 2.0 2.0]

nPts=48

$P_m=1e^6$

GIw=1

IndexBest=36

Xbest=[0.9106 1.1628 0.7368 1.1898]

Fbest=5768.5 stb

GIbest=0

Pbest=5768.5

Sbest=Feasible

Time=1007.60 secs

FIG. 5.2 depicts an example network to be solved by using a radial basis function approximation scheme for expensive function optimization with expensive nonlinear constraints. The example network comprises 26 wells (512.01-512.26), manifold nodes (514.1, 514.2, 514.3, 514.4, 514.5), and a sink node (518). The connecting lines are branches (516.1, 516.2, 516.3, 516.4, 5165) and each well (512.01-512.26) is associated with a pressure specified boundary condition.

The optimization problem of the example network is defined by the following:

$$\max F(X) = NET(X) \quad (19)$$

$$\text{s.t.} \sum_{i=1}^{N} X_i \leq 45$$

$$0.2 \leq X_i \leq 3.0$$

$$i \in [1, \ldots, 26]$$

Where $X_i$ is the i-th control variable. The objective function of the optimization problem can be stated as the total liquid rate, oil rate, or profit ensuing from the production achieved at the sink (518) of the network. In this example, 45 MMscfd of lift-gas are available for allocation.

Several additional operating constraints that can be imposed on the model at the manifold (514.1, 514.2, 514.3, 514.4, 514.5) and sink level (518) are defined below in Table 1 below. In particular, gas and liquid constraints are imposed on each manifold (514.1, 514.2, 514.3, 514.4, 514.5), while gas, liquid, oil and water handling constraints are imposed at the sink level (518), as seen in FIG. 5.3. Specifically, FIG. 5.3 depicts results for the liquid production objective with (522.1) and without (522.2) the inclusion of the additional operating constraints. Each of the nonlinear constraints are simulation dependent and are considered expensive to evaluate. Only the single linear inequality constraint, indicating the available lift gas quantity, is inexpensive. As shown below in Table 2, results for the liquid production objective are presented with and without the inclusion of the additional simulation-dependent constraints listed in Table 1 below.

TABLE 1

Model Operating Constraints

| No | Constraint | Manifold | Type | Value | Unit |
|---|---|---|---|---|---|
| 1 | GE1(X) | M1 | Gas | 20 | MMscfd |
| 2 | GE2(X) | M2 | Gas | 18 | MMscfd |
| 3 | GE3(X) | M3 | Gas | 12 | MMscfd |
| 4 | GE4(X) | M4 | Gas | 15 | MMscfd |
| 5 | GE5(X) | M1 | Liquid | 14,000 | STB |

TABLE 1-continued

Model Operating Constraints

| No | Constraint | Manifold | Type | Value | Unit |
|---|---|---|---|---|---|
| 6 | GE6(X) | M2 | Liquid | 12,000 | STB |
| 7 | GE7(X) | M3 | Liquid | 12,000 | STB |
| 8 | GE8(X) | M4 | Liquid | 15,000 | STB |
| 9 | GE9(X) | Sink | Liquid | 41,000 | STB |
| 10 | GE10(X) | Sink | Oil | 36,000 | STB |
| 11 | GE11(X) | Sink | Water | 8,000 | STB |
| 12 | GE12(X) | Sink | Gas | 48 | MMscfd |
| 13 | GI1(X) | Network | Lift Gas | 45 | MMscfd |

TABLE 2

Model Optimization Results - Liquid

| Liquid Production | | Without GE(X) | With GE(X) |
|---|---|---|---|
| Allocated Lift-Gas by well (MMscfd) | W01 | 0.78874 | 1.6155 |
| | W02 | 3.0 | 2.1841 |
| | W03 | 0.74626 | 0.3367 |
| | W04 | 1.703 | 2.8413 |
| | W05 | 0.80052 | 0.9731 |
| | W06 | 0.69684 | 1.7040 |
| | W07 | 0.93931 | 0.4548 |
| | W08 | 1.7011 | 1.2998 |
| | W09 | 0.82645 | 2.8692 |
| | W10 | 0.96774 | 2.7754 |
| | W11 | 0.53267 | 2.0828 |
| | W12 | 2.1858 | 0.4718 |
| | W13 | 0.9667 | 2.4780 |
| | W14 | 1.9476 | 2.3756 |
| | W15 | 2.891 | 0.2397 |
| | W16 | 2.672 | 0.5167 |
| | W17 | 0.88535 | 0.9467 |
| | W18 | 2.8676 | 0.5864 |
| | W19 | 2.9658 | 1.1421 |
| | W20 | 2.5297 | 0.4761 |
| | W21 | 3.0 | 0.5311 |
| | W22 | 3.0 | 0.2 |
| | W23 | 1.4935 | 0.2633 |
| | W24 | 1.2271 | 1.7824 |
| | W25 | 0.66537 | 1.7319 |
| | W26 | 3.0 | 0.3873 |
| Constraint Value | GE$_1$(X) | [−19.56] | −19.55 |
| | GE$_2$(X) | [−13.59] | −13.72 |
| | GE$_3$(X) | [−8.34] | −8.77 |
| | GE$_4$(X) | [−10.39] | −11.01 |
| | GE$_5$(X) | [−11175] | −11111 |
| | GE$_6$(X) | [250.60] | −92.36 |
| | GE$_7$(X) | [785.47] | −539.77 |
| | GE$_8$(X) | [3050.70] | −390.66 |
| | GE$_9$(X) | [4911.50] | −134.05 |
| | GE$_{10}$(X) | [2802.80] | −860.73 |
| | GE$_{11}$(X) | [−891.34] | −2273.32 |
| | GE$_{12}$(X) | [−34.88] | −36.06 |
| | GI$_1$(X) | −7.10e−15 | −11.73 |
| Objective Function (STB) | | 45,911 | 40,866 |
| Simulation Evaluations | | 54 | 62 |
| Time (secs) | | 6059 | |

Figure 6:
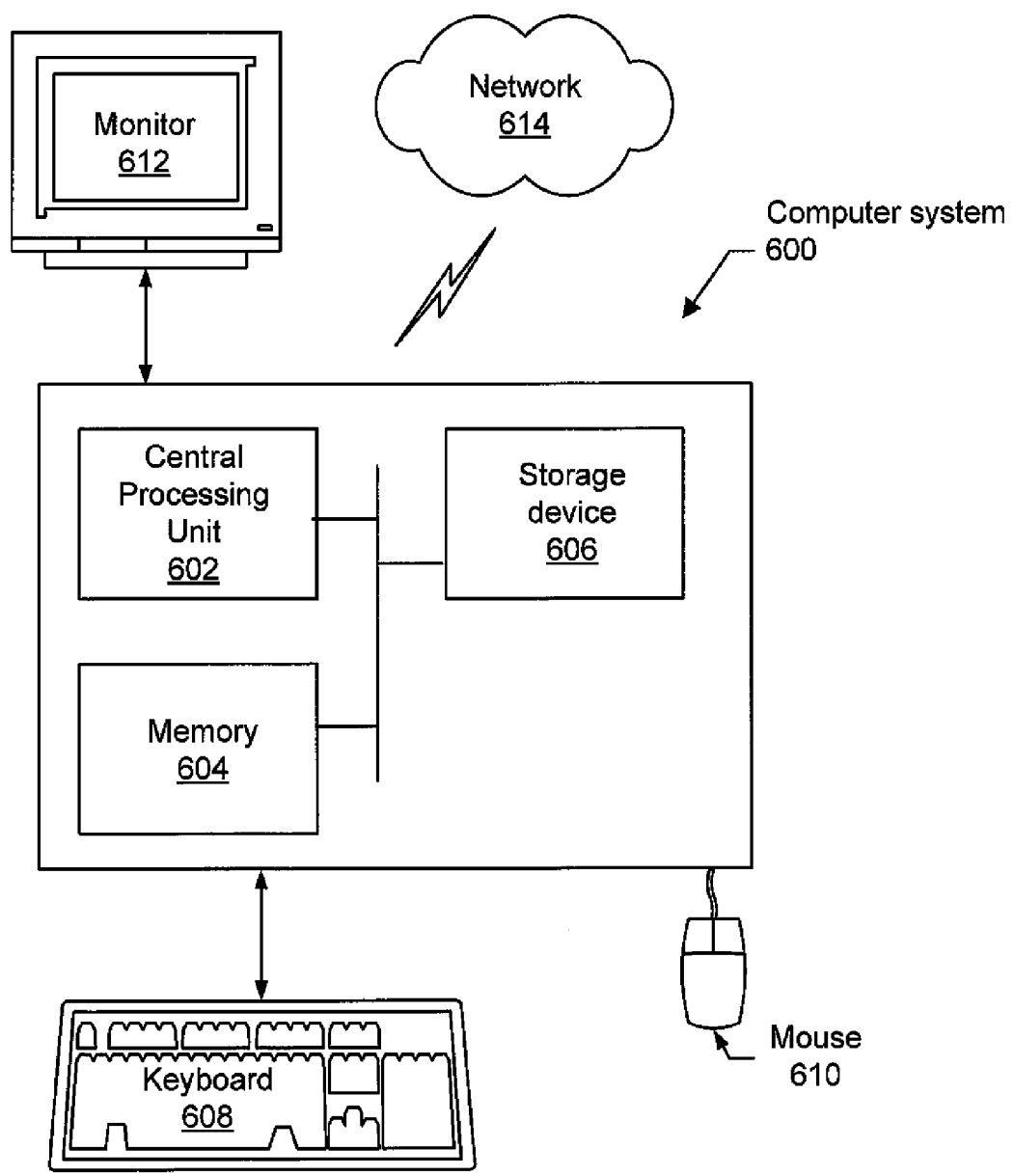
FIG. 6 depicts a computer system in which one or more embodiments of proxy methods for expensive function optimization with expensive nonlinear constraints may be implemented.

Embodiments of proxy methods for expensive function optimization with expensive nonlinear constraints may be implemented on virtually any type of computer regardless of the platform being used. For instance, as depicted in FIG. 6, a computer system (600) includes one or more processor(s) (602) such as an integrated circuit, a central processing unit (CPU), or other hardware processor, associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer (600) may also include input means, such as a keyboard (608), a mouse (610), or a microphone (not shown). Further, the computer (600) may include output means, such as a monitor (612) (e.g., a liquid crystal display LCD, a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (600) includes at least the minimal processing, input, and/or output means necessary to practice one or more embodiments.

Further, those skilled in the art will appreciate that one or more elements of the aforementioned computer system (600) may be located at a remote location and connected to the other elements over a network. Further, one or more embodiments may be implemented on a distributed system having a plurality of nodes, where each portion of the implementation (e.g., the dip analysis tool, the servers) may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a non-transitory computer readable storage medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground fluids or other geomaterials materials from other fields. Further, portions of the systems and methods may be implemented as software, hardware, firmware, or combinations thereof.

While the invention has been described with respect to a limited number of embodiments, those skilled in the art, having benefit of this disclosure, will appreciate that other embodiments may be devised which do not depart from the scope of proxy methods for expensive function optimization with expensive nonlinear constraints as disclosed herein. Accordingly, the scope of proxy methods for expensive function optimization with expensive nonlinear constraints should be limited only by the attached claims.

What is claimed is:

1. A method for optimizing expensive functions with expensive nonlinear constraints, comprising:
   a1) partitioning constraints to an expensive function into inexpensive and expensive constraints;
   a2) selecting sample data for evaluating the expensive function of a simulation;
   b) generating, by a computer processor, a function proxy model for the expensive function using an approximation scheme, wherein the expensive function is an objective function and the function proxy model models the objective function;
   c1) generating, by the computer processor, a constraint proxy model for an expensive nonlinear constraint associated with the expensive function, wherein generating the constraint proxy model comprises replacing at least one expensive equality constraint with at least one less expensive constraint proxy, and wherein each constraint proxy is distinct from the function proxy model;
   c2) incorporating the at least one expensive constraint proxy into the constraints to the expensive function;
   d) calculating a first solution point for the simulation using at least both the function proxy model for the objective function and the constraint proxy model as a constraint;
   e) evaluating, by the computer processor, the expensive function of the simulation at the first solution point from the function proxy model and constraint proxy model using the sample data;
   f) when the expensive function, the function proxy model, and the constraint proxy model do not converge at the first solution point:
      adding the first solution point to the sample data to obtain updated sample data; and
      updating the function proxy model and the constraint proxy model based on the updated sample data;
   g) repeating steps d) through f) until the expensive function, the function proxy model, and the constraint proxy model converge at the first solution point; and
   (h) when the expensive function, the function proxy model, and the constraint proxy model converge at the first solution point, identifying an optimal solution of the function proxy model and the constraint proxy model.

2. The method of claim 1, wherein calculating the first solution point further comprises:
   solving a local search optimization problem using the function proxy model and the constraint proxy model to calculate the first solution point, wherein the local search optimization problem comprises a minimum radius of exclusion for specifying a first minimum separation distance of the first solution point from existing points in the sample data.

3. The method of claim 2, further comprising:
   solving at least one expansive search optimization problem using the function proxy model and the constraint proxy model to calculate a second solution point, wherein the at least one expansive search optimization problem comprises a maximum radius of exclusion for identifying a second minimum separation distance of the second solution point from the existing points in the sample data,
   wherein the second minimum separation distance decreases from the maximum radius of exclusion towards the minimum radius of exclusion for each repetition of steps d) through f).

4. The method of claim 1, further comprising:
   determining that the sample data is infeasible with respect to inexpensive constraints of the expensive function; and
   solving an auxiliary optimization problem to ensure the sample data is feasible, wherein the sample data is feasible when the sample data conforms to the inexpensive constraints.

5. The method of claim 1, wherein the optimal solution is identified using a penalty function P(X):

$$P(X) = F(X) + \lambda \left[ \sum_{j=1}^{J} w_u \max(0, g_j(X))^2 + \sum_{k=1}^{K} w_k (h_k(X))^2 \right],$$

wherein J is a total number of inequality constraints, K is a total number of inexpensive equality constraints, $\lambda$ is a penalty multiplier, $w_j$ are associated weights of the inequality constraints, $w_k$ are associated weights of equality constraints, X represents the vector of control variables, and F(X) is the objective function value at X, $g_j(X)$ represents the $j^{th}$ expensive nonlinear inequality constraint at X, and $h_k(X)$ represents the $k^{th}$ expensive nonlinear equality constraint at X.

6. The method of claim 1, wherein the approximation scheme is a multiquadric radial basis function that is trained by establishing a highest value of a tuning parameter, wherein the highest value of the tuning parameter reproduces the sample data within a desired tolerance.

7. The method of claim 1, wherein the approximation scheme is a neural network with an output for each modeled quantity of the simulation.

8. The method of claim 1, wherein the expensive function, the function proxy model, and the constraint proxy model are determined to converge when convergence conditions are satisfied, and wherein the convergence conditions are satisfied when any one of the convergence conditions is satisfied for a number of consecutive repetitions of steps d) through f).

9. A system for optimizing expensive functions with expensive nonlinear constraints, comprising:
  a memory; and
  a processor, operatively connected to the memory and having functionality to execute instructions for:
    a1) partitioning constraints to an expensive function into inexpensive and expensive constraints;
    a2) selecting sample data for evaluating an expensive function of a simulation;
    b) generating a function proxy model for the expensive function using an approximation scheme, wherein the expensive function is an objective function and the function proxy model models the objective function;
    c1) generating a constraint proxy model for an expensive nonlinear constraint associated with the expensive function, wherein generating the constraint proxy model comprises replacing at least one expensive equality constraint with at least one less expensive constraint proxy, and wherein each constraint roxy is distinct from the function proxy model;
    c2) incorporating the at least one expensive constraint proxy into the constraints to the expensive function;
    d) calculating a first solution point for the simulation using at least both the function proxy model for the objective function and the constraint proxy model as a constraint;
    e) evaluating the expensive function of the simulation at the first solution point from the function proxy model and constraint proxy model using the sample data;
    f) if the expensive function, the function proxy model, and the constraint proxy model do not converge at the first solution point:
      adding the first solution point to the sample data to obtain updated sample data; and
      updating the function proxy model and the constraint proxy model based on the updated sample data; and
    g) when the expensive function, the function proxy model, and the constraint proxy model converge at the first solution point, identifying an optimal solution of the function proxy model and the constraint proxy model.

10. The system of claim 9, wherein calculating the first solution point further comprises:
  solving a local search optimization problem using the function proxy model and the constraint proxy model to calculate the first solution point, wherein the local search optimization problem comprises a minimum radius of exclusion for specifying a first minimum separation distance of the first solution point from existing points in the sample data.

11. The system of claim 10, wherein the processor further comprises functionality to execute instructions for:
  solving at least one expansive search optimization problem using the function proxy model and the constraint proxy model to calculate second solution points, wherein the at least one expansive search optimization problem comprises a maximum radius of exclusion for identifying a second minimum separation distance of the second solution points from the existing points in the sample data, wherein the second minimum separation distance decreases from the maximum radius of exclusion towards the minimum radius of exclusion for each repetition of steps d) through f).

12. The system of claim 9, wherein the processor further comprises functionality to execute instructions for:
  determining that the sample data is infeasible with respect to inexpensive constraints of the expensive function; and
  solving an auxiliary optimization problem to ensure the sample data is feasible, wherein the sample data is feasible when the sample data conforms to the inexpensive constraints.

13. The system of claim 9, wherein the optimal solution is identified using a penalty function P(X):

$$P(X) = F(X) + \lambda \left[ \sum_{j=1}^{J} w_u \max(0, g_j(X))^2 + \sum_{k=1}^{K} w_k (h_k(X))^2 \right],$$

wherein J is a total number of inequality constraints, K is a total number of inexpensive equality constraints, $\lambda$ is a penalty multiplier, $w_j$ are associated weights of the inequality constraints, and $w_k$ are associated weights of equality constraints, X represents the vector of control variables, and F(X) is the objective function value at X, $g_j X$ represents the $j^{th}$ expensive nonlinear inequality constraint at X, and $h_k(X)$ represents the $k^{th}$ expensive nonlinear equality constraint at X.

14. The system of claim 9, wherein the approximation scheme is a multiquadric radial basis function that is trained by establishing a highest value of a tuning parameter, wherein the highest value of the tuning parameter reproduces the sample data within a desired tolerance.

15. The system of claim 9, wherein the approximation scheme is a neural network with an output for each modeled quantity of the simulation.

16. A non-transitory computer readable storage medium comprising instructions for optimizing expensive functions with expensive nonlinear constraints, the instructions when executed causing a processor to:
  a1) partition constraints to an expensive function into inexpensive and expensive constraints;
  a2) select sample data for evaluating an expensive function of a simulation;
  b) generate a function proxy model for the expensive function using an approximation scheme, wherein the expensive function is an objective function and the function proxy model models the objective function;
  c1) generate a constraint proxy model for an expensive nonlinear constraint associated with the expensive function, wherein generating the constraint proxy model comprises replacing at least one expensive equality constraint with at least one less expensive constraint proxy, and wherein each constraint proxy is distinct from the function proxy model;

c2) incorporate the at least one expensive constraint proxy into the constraints to the expensive function;

d) calculate a first solution point for the simulation using at least both the function proxy model for the objective function and the constraint proxy model as a constraint;

e) evaluate the expensive function of the simulation at the first solution point from the function proxy model and constraint proxy model using the sample data; and f) when the expensive function, the function proxy model, and the constraint proxy model do not converge at the first solution point:

add the first solution point to the sample data to obtain updated sample data; and update the function proxy model and the constraint proxy models based on the updated sample data.

17. The non-transitory computer readable storage medium of claim 16, wherein the instructions when executed further cause the processor to:

g) repeat steps d) through f) until the expensive function, the function proxy model, and the constraint proxy model converge at the first solution point; and h) when the expensive function, the function proxy model, and the constraint proxy models converge at the first solution point, identify an optimal solution of the function proxy model and the constraint proxy model.

18. The non-transitory computer readable storage medium of claim 17, wherein calculating the first solution point further comprises:

solving a local search optimization problem using the function proxy model and the constraint proxy model to calculate the first solution point, wherein the local search optimization problem comprises a minimum radius of exclusion for specifying a first minimum separation distance of the first solution point from existing points in the sample data.

19. The non-transitory computer readable storage medium of claim 18, wherein the instructions when executed further cause the processor to:

solve at least one expansive search optimization problem using the function proxy model and the constraint proxy model to calculate a second solution point, wherein the at least one expansive search optimization problem comprises a maximum radius of exclusion for identifying a second minimum separation distance of the second solution point from the existing points in the sample data, wherein the second minimum separation distance decreases from the maximum radius of exclusion towards the minimum radius of exclusion for each repetition of steps d) through f).

* * * * *